United States Patent
Link, II et al.

(10) Patent No.: US 6,731,926 B1
(45) Date of Patent: May 4, 2004

(54) SYSTEM AND METHOD FOR DELIVERING A MESSAGE WAITING INDICATOR MESSAGE TO A WIRELESS SYSTEM

(75) Inventors: Charles M. Link, II, Roswell, GA (US); Donald M. Cardina, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 428 days.

(21) Appl. No.: 09/822,511

(22) Filed: Apr. 2, 2001

(51) Int. Cl.[7] ............................................. H04M 11/10
(52) U.S. Cl. ................... 455/412.2; 455/466; 379/67.1
(58) Field of Search .................................. 455/413, 417, 455/433, 412.1, 412.2, 466; 379/67.1

(56) References Cited

U.S. PATENT DOCUMENTS

| H1895 H | * | 10/2000 | Bauer ......................... 455/433 |
| 6,418,306 B1 | * | 7/2002 | McConnell ................. 455/413 |

OTHER PUBLICATIONS

*Message Waiting Indicator Control and Notification–Supplementary Services and Associated Switching and Signaling Specifications*, ANSI TI.622–1998.

*Cellular Radiotelecommunications Intersystem Operations: Signaling Protocols*, TIA/EIA Interim Standard IS–41.5–C.

*Wireless Short Message Service (SMS) Tutorial*, www.iec.org.

* cited by examiner

*Primary Examiner*—William Trost
*Assistant Examiner*—Nawara T. Omary
(74) *Attorney, Agent, or Firm*—Shaw Pittman LLP

(57) ABSTRACT

A system and method for delivering a message waiting indicator (MWI) message to a wireless system, such that a Mobile Telephone Switching Office (MTSO) of the wireless system can recognize the MWI message and correspondingly activate an MWI on a wireless device (e.g., a wireless telephone). The present invention enables a messaging service provider, which is in communication with a wireline network through a central office, to send an MWI message through the central office and to a wireless device as a part of an integrated voicemail messaging service. According to one embodiment, the present invention processes a standard SS7 ReportEventMessageAvailable message, making the message compatible with a desired wireless protocol, such as analog, Time Division Multiple Access (TDMA), Code Division Multiple Access (CDMA), and Global System for Mobile Communications (GSM). An MWI processor executes this process anywhere between, and including, the messaging service provider and the MTSO.

31 Claims, 8 Drawing Sheets

SYSTEM AND METHOD FOR DELIVERING A MESSAGE WAITING INDICATOR MESSAGE TO A WIRELESS SYSTEM

BACKGROUND

FIELD OF THE INVENTION

The present invention relates to the field of switched telephony, and more particularly, to a method and system for integrating wireless telephones into a wireline messaging environment.

BACKGROUND OF THE INVENTION

With the proliferation of wireless communication networks, many telephone customers now use a combination of wireline and wireless telephones to meet their communication needs. Indeed, it is not uncommon for a single user to have more than one telephone line at home, more than one telephone line at work, and at least one wireless telephone. Telephone customers have come to depend on the flexibility of this combination to communicate irrespective of location.

Having multiple wireline and wireless telephone numbers, however, presents problems retrieving telephone messages. Usually, a caller who calls a user who subscribes to multiple telephone lines dials one of the user's telephone numbers. If the user is away from the particular device that is called and does not answer the call, the caller typically leaves a message on a voicemail system. In the past, such voicemail systems have been isolated on the network of the particular telephone line that is called. Thus, to retrieve all messages, a user had to check the voicemail system of each network separately.

Recognizing the trouble of constantly checking multiple voicemail systems, messaging service providers (MSPs) developed voicemail systems that integrate incoming messages across different networks. Thus, for example, a user could direct all messages for her wireline and wireless telephone lines to a single voicemail box. Consequently, the user would need only to check a single voicemail box to retrieve all messages.

According to these standard voicemail systems, a voicemail platform is in communication with a central office switch. The central office switch is in communication with the wireline and wireless networks. Unanswered calls to a subscriber's wireline and wireless telephone numbers are routed to the voicemail platform through the central office. Thus, regardless of the particular telephone number the caller dials, all voicemail messages end up in the same voicemail platform.

Despite providing centralized voicemail boxes, these integrated voicemail services present difficulties in notifying a user of the receipt of a message. Specifically, because all unanswered calls are forwarded through the central office to the voicemail platform, the voicemail platform is responsible for activating message waiting indicators on all of the associated telephones (e.g., a stutter dial tone, an illuminated light, or a displayed icon). Thus, for example, if a user away from his work office receives an unanswered call to his wireline office telephone, and the call is forwarded to the voicemail platform, which records a message, then, ideally, the user would want to receive a message waiting indicator on his wireless telephone to report to him that he has received a new voicemail message. This notification would avoid the burden of constantly checking the voicemail for messages received through a remote telephone. Similarly, if the user is in his office and receives a message through an unanswered call to his wireless telephone, which is turned off or out of range, the user would want to receive an indication of the message on his office wireline telephone.

To provide message waiting indicators on all of a user's associated telephones, wireline network providers developed methods for supporting messaging from the voicemail platform to a "foreign network." As used herein, "foreign network" refers to a network that is not local to the network including the central office switch that serves the message provider. This local central office switch is sometimes referred to herein as the host switch.

FIG. 1 illustrates a typical prior art method and system for providing messaging from a voicemail platform to a foreign network. Messaging service provider 100 contains a telephone list 102 indicating telephone numbers that a subscriber to the messaging service has associated with her voicemail box. An unanswered call to any of the listed telephone numbers is routed to messaging service provider 100 for the recording of a message and the indicating of the recorded message. In this example, the subscriber has associated with the messaging service a wireline telephone number, 404-332-212X, and two wireless telephone numbers, 404-792-123X and 404-792-100X.

Telephone list 102 also contains an activation flag indicating whether the subscriber has subscribed to the message waiting indicator (MWI) feature for the particular telephone number (device). In some instances, for example, on a seldom-used mobile telephone, a subscriber might not care to have, nor want to pay, for an MWI displayed on the mobile telephone. In this example, the subscriber has opted for the MWI feature on two telephone lines, 404-332-212X and 404-792-123X.

Once messaging service provider 100 receives an unanswered call to one of the three telephone numbers and records a message, messaging service provider 100 sends an MWI message for each of the activated telephone numbers on list 102. For the wireline telephone number, messaging service provider 100 transmits an MWI message to a host switch 104 using Inter-switch Simplified Message Desk Interface (ISMDI). Host switch 104 is a central office switch. ISMDI is a signaling interface used by a messaging service provider to support incoming call and message waiting integration between all supported switches in a Local Access and Transport Area (LATA). Simplified Message Desk Interface (SMDI) defines signaling between a messaging system and a central office switch, which defines the original intended destination of a forwarded call.

After receiving an MWI message for the wireline telephone number 404-322-212X, host switch 104 determines if it "owns" (i.e., is associated with) the NPA/NXX (NPA—Numbering Plan Area/NXX—a specific central office) corresponding to the telephone number, and further, if it owns the particular number (last four digits). In this example, host switch 104 does own 404-322-212X. Therefore, host switch 104 activates an MWI (for example, a stutter dial tone) on the subscriber's wireline telephone 106.

For the wireless telephone number 404-792-123X, messaging service provider 100 forwards to host switch 104 an ISMDI MWI message that references the wireless telephone number. Host switch 104 determines that it does not own 404-792, and in response, forwards to a signal transfer point (STP) 108 an MWI message using a non-call-associated Signaling System 7 (SS7) signaling protocol, such as Transaction Capabilities Application Part (TCAP).

Wireline network signal transfer point 108 contains a table 110 that cross-references NPA/NXXs with network point codes. Point codes identify every node in the SS7 network in the format NNN CCC XXX, where NNN is a network identifier, CCC is a cluster identifier, and XXX is the node identifier. In this example, table 110 shows that 404-792 corresponds to point code 001.002.052. With this routing information, wireline network signal transfer point 108 transmits a TCAP message to wireless network signal transfer point 112, which serves the wireless network 114 corresponding to point code 001.002.052. In this example, wireless network 114 is the foreign network.

Within wireless network 114, protocol gateway 116 translates the TCAP MWI message to a signaling protocol compatible with the wireless network, for example, Interim Standard 41 (IS-41). After the translation, protocol gateway 116 transmits an MWI message through mobile switching center 118 and antenna 120 to the subscriber's wireless telephone 122. In response to the MWI message, wireless telephone 122 indicates that a message has been recorded in messaging service provider 100 by, for example, displaying an icon on its screen.

According to the conventional method shown in FIG. 1, routing is based on the 6-digit NPA/NXX, relying on the fact that the networks to which the foreign network telephone numbers belong (which, in this example, are wireless telephone numbers of a wireless network) can be identified based solely on the NPA/NXX. In other words, the method assumes that each NPA/NXX, as a block of 10,000 telephone numbers, is wholly owned by a single foreign network carrier (e.g., a single wireless carrier). Under this assumption, the host wireline telephone network can route all calls for a NPA/NXX to a particular trunk group of a foreign network carrier.

Unfortunately, not all NPA/NXXs are wholly owned by a single carrier. In fact, within a block of 10,000 telephone numbers in a NPA/NXX, some numbers may be assigned to the wireline network, some may be assigned to a wireless network, and still others may be assigned to other wireline and wireless networks. As used herein, a "shared NPA/NXX" refers to this situation, in which the block of 10,000 telephone numbers in an NPA/NXX is assigned to more than one entity. Therefore, to forward message waiting indicator messages to the proper foreign network carrier of a particular foreign network telephone number, the routing network must distinguish the foreign network telephone numbers from the other network numbers on a more granular basis. In other words, the routing network must identify the different networks to which individual telephone numbers within a single shared NPA/NXX belong.

The following co-pending related applications, which are assigned to the assignee of the present invention, solve the above-described problem of forwarding information, such as a message waiting indicator, to a telephone number of a foreign network (e.g., a wireless network) that is part of a shared NPA/NXX: application Ser. No. 09/742,376, "Method and System for Message Routing," by James C. Bedingfield, filed Dec. 22, 2000, and application Ser. No. 09/742,377, "Method and System for Message Routing," by James C. Bedingfield, filed Dec. 22, 2000. Related application Ser. No. 09/742,376 uses a service control point (SCP) and a service package application (SPA) to deliver an MWI message from a message service provider to a wireless telephone number of a shared NPA/NXX. Related application Ser. No. 09/742,377 uses a special or inactive (i.e., "pseudo") NPA to deliver the MWI message. Each of these related applications is hereby incorporated by reference in its entirety.

Although the related applications solve the problem of delivering an MWI message to a wireless network for a telephone number of a shared NPA/NXX, there remains a need for a system and method for receiving an MWI message in a wireline TCAP format, translating the MWI message from the wireline TCAP format to a protocol compatible with the wireless network, and delivering the reformatted MWI message to a wireless telephone to activate the MWI. Specifically, with reference to FIG. 1, there remains a need for a system and method for delivering an MWI from STP 112 to wireless telephone 122, within wireless network 114, such that wireless telephone 122 indicates the presence of a message in a user's voicemail box.

FIG. 2 illustrates the challenges involved in receiving an MWI message from a wireline network and, in response, activating an MWI on a wireless telephone. As shown, calling party 200 is in communication with a central office 202, which is part of a wireline network 204. Called party 206, a wireline telephone, is also in communication with central office 202.

For clarity, FIG. 2 does not show every component of a conventional voicemail messaging network. One of ordinary skill in the art would appreciate, however, that such a network would include additional components (e.g., signal transfer points, or STPs) and redundant components (e.g., multiple central offices).

Called party 206 subscribes to an integrated voicemail messaging service, which is provided by messaging service provider 208. Messaging service provider 208 is in communication with central office 210, which, in turn, is in communication with central office 202. Typically, the connection between the voicemail platform of messaging service provider 208 and central office 210 is an SMDI link, but the connection could be implemented using other technologies such as SS7 or Transmission Control Protocol/Internet Protocol (TCP/IP).

To establish a central voicemail box according to the integrated voicemail messaging service, the subscriber of called party 206 associates his wireless telephone 212 with his voicemail box in messaging service provider 208. In this way, messaging service provider 208 records a message from any of the subscriber's associated wireline and wireless telephones (which are telephones 206 and 212 in this example). Wireless telephone 212 is in communication with messaging service provider 208 through antenna 211, Mobile Telephone Switching Office (MTSO) 214, and central office 210. MTSO 214 corresponds to mobile switch 118 of FIG. 1.

In addition to recording messages from all associated telephones, as explained above, it is desirable for messaging service provider 208 to activate MWIs on all of the associated telephones, after a message has been recorded. For wireline telephones, activating an MWI from messaging service provider 208 is simple because messaging service provider 208 forwards an SS7 message recognizable to central offices and wireline telephones. On the other hand, MTSOs and wireless telephones do not recognize the type of message delivered by messaging service provider 208. Thus, there remains a need for a system and method for activating an MWI on a wireless telephone in this context. The following example illustrates this need in more detail.

This example assumes that calling party 200 has dialed either called party 206 (404-555-2222) or wireline telephone 212 (770-555-1234), that the call was not completed (e.g., the called party did not answer, the line was busy, or the subscriber had activated a call forward busy feature), and that the call was forwarded to messaging service provider 208 and a message was recorded. With a message recorded, messaging service provider 208 must now activate the MWIs on all of the called party's telephones.

According to a conventional method, messaging service provider 208 sends a message to central office 210 through an SMDI link. Central office 210 converts the SMDI message into a wireline SS7 TCAP message, known as a ReportEventMessageAvailable message. A ReportEventMessageAvailable message is a TCAP operation used with Voice Message Storage Retrieval (VMSR) systems. When a subscriber uses such a service, and the VMSR system is located at another exchange (other than the subscriber's), the ReportEventMessageAvailable operation is used to alert the subscriber's exchange of a message. In other words, the ReportEventMessageAvailable message instructs a central office to activate an MWI for a particular telephone. Thus, in this example, central office 210 forwards the ReportEventMessageAvailable message to central office 202 to activate the MWI on the wireline telephone of called party 206. The MWI could be a stutter dial tone or an illuminated light, for example.

The publication, *Message Waiting Indicator Control and Notification—Supplementary Services and Associated Switching and Signaling Specifications*, ANSI T1.622-1998, describes how a messaging service provider associated with one central office can activate an MWI on a telephone associated with a second central office. This publication is hereby incorporated by reference in its entirety.

Optionally, instead of using an SMDI link, some voicemail platforms support SS7 signaling with the central office. In such a case, in FIG. 2, messaging service provider 208 would forward the ReportEventMessageAvailable message through an SS7 link to central office 210. Central office 210 would then forward the ReportEventMessageAvailable message to central office 202 to activate the MWI on the wireline telephone of called party 206.

Although ANSI T1.622-1998 addresses MWI messaging between central offices of a wireline network, it does not facilitate MWI messaging between a central office of a wireline network and an MTSO of a wireless network. Simply put, the MTSOs prevalent in conventional network systems do not recognize the ReportEventMessageAvailable message of ANSI T1.622-1998. Thus, in FIG. 2, forwarding a ReportEventMessageAvailable message from central office 210 to MTSO 214 will not activate an MWI on wireless telephone 212.

SUMMARY OF THE INVENTION

The present invention is a system and method for delivering an MWI message to a wireless system, such that an MTSO of the wireless system can recognize the MWI message and correspondingly activate an MWI on a wireless device (e.g., a wireless telephone). The present invention cooperates with conventional SS7 messaging to facilitate the delivery of MWI messages from wireline networks to wireless networks. In this manner, the present invention enables a messaging service provider, which is in communication with a wireline network through a central office, to send an MWI message through the central office and to a wireless device as a part of an integrated voicemail messaging service. Thus, the messaging service provider is able to activate an MWI on all devices that a subscriber has (i.e., wireline and wireless devices) to indicate that a message has been recorded. The MWI could be, for example, an icon, an illuminated light, or a text message.

According to a representative embodiment, the present invention processes a standard SS7 ReportEventMessageAvailable message, making the message compatible with a desired wireless protocol, such as analog, Time Division Multiple Access (TDMA), Code Division Multiple Access (CDMA), and Global System for Mobile Communications (GSM). An MWI processor executes this function anywhere between, and including, the messaging service provider and the MTSO.

For example, the central office of the messaging service provider could deliver a ReportEventMessageAvailable message to the wireless network, in the same way that the central office delivers a ReportEventMessageAvailable message to other central offices of a wireline network according to conventional SS7 signaling. An MWI processor in the wireless network would receive the ReportEventMessageAvailable message, transform the data into a compatible wireless protocol (as described in detail below), and deliver the message to a MTSO to activate an MWI on a particular wireless device.

For wireless telephones operating under analog, TDMA, and CDMA protocols, an embodiment of the present invention activates an MWI through a unique use of an InformationDirective message.

For wireless telephones operating under GSM standards, an embodiment of the present invention activates an MWI using Short Message Peer-to-Peer (SMPP) messaging.

Also for wireless telephones operating under GSM standards, another embodiment of the present invention activates an MWI using Short Message Service (SMS) information requests.

DETAILED DESCRIPTION OF THE INVENTION

Figure 1:
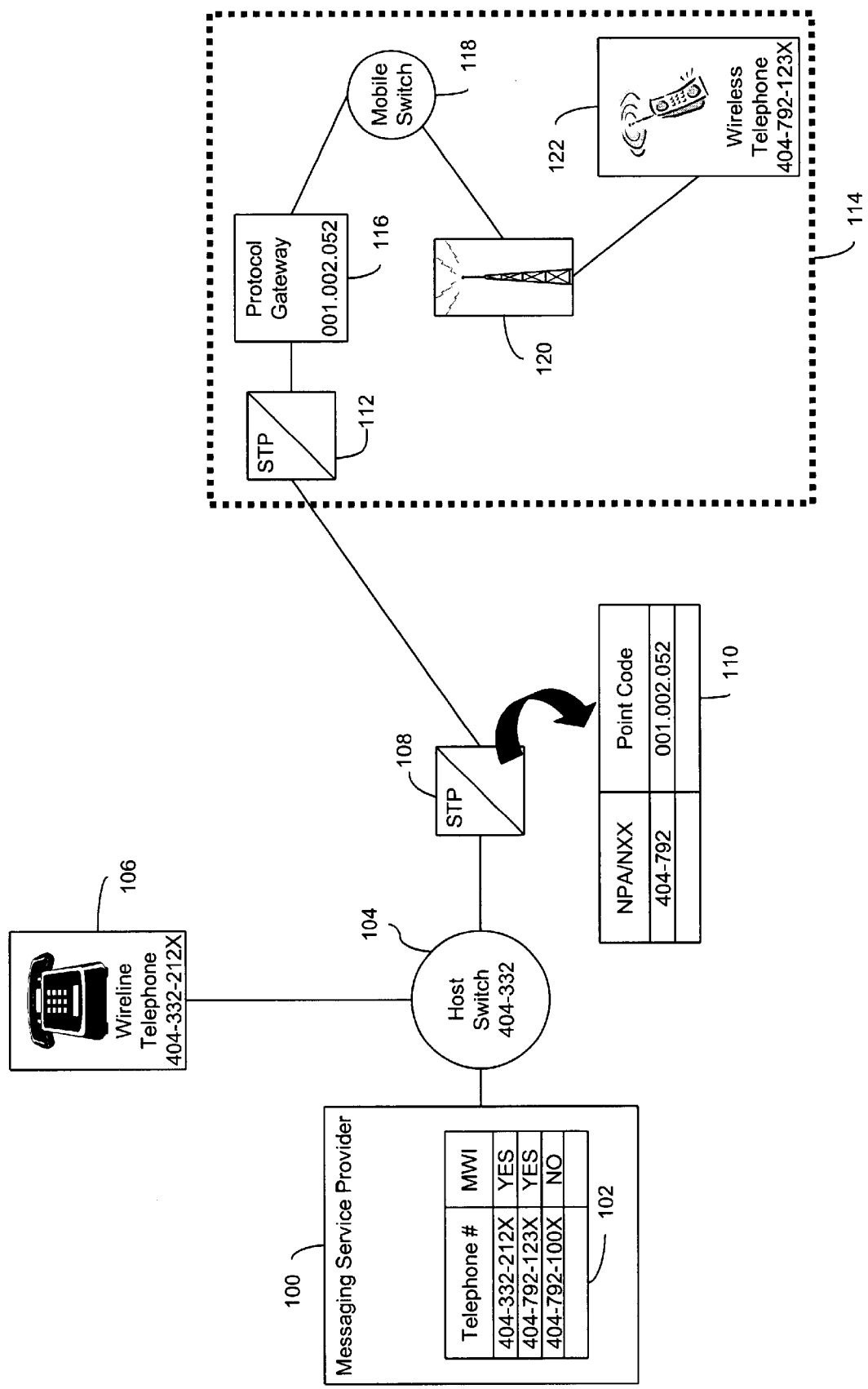
FIG. 1 is a schematic diagram of a prior art system architecture for providing messaging from a voicemail platform to a foreign network.
Figure 2:
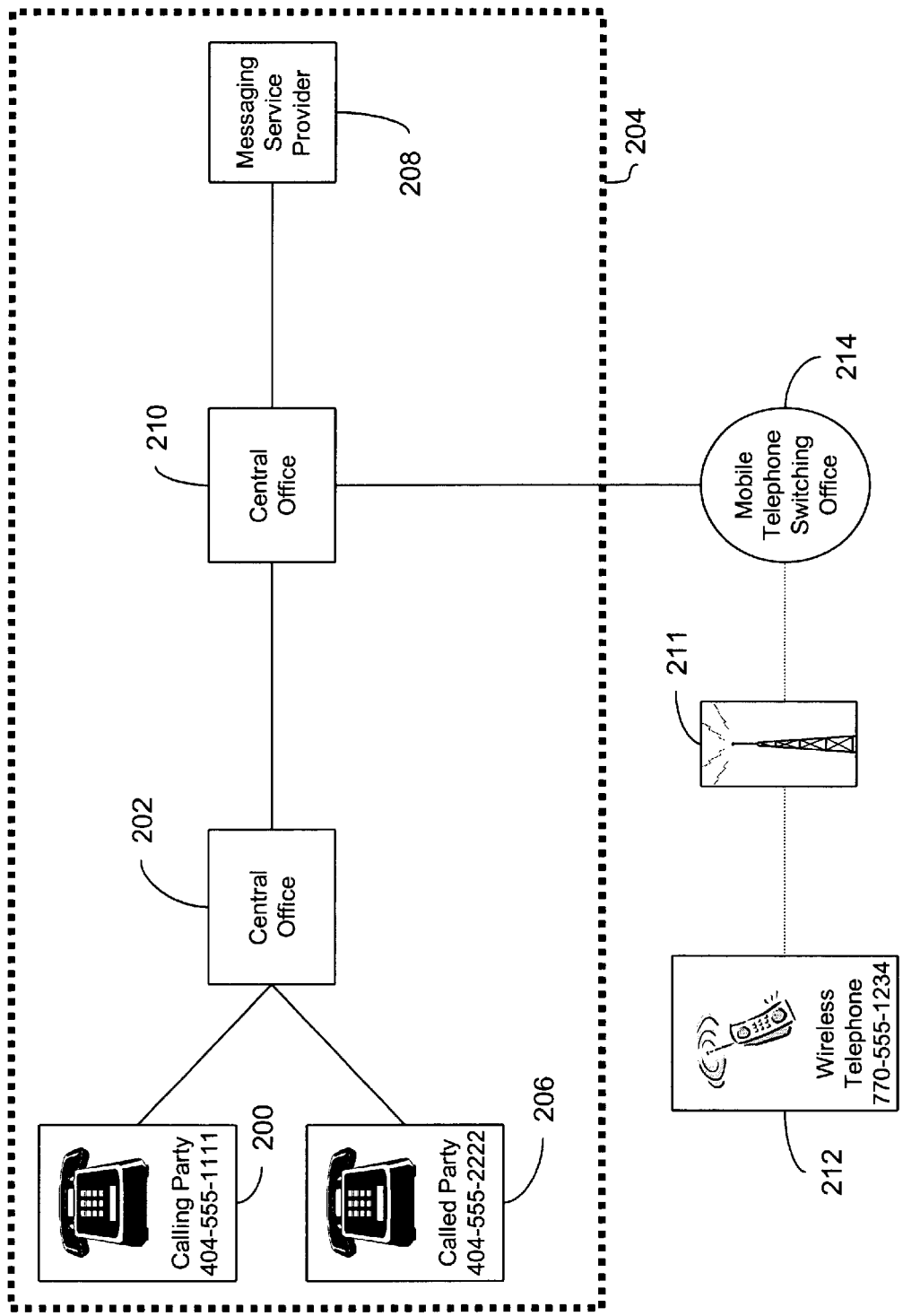
FIG. 2 is a schematic diagram of a system architecture for delivering an MWI message between central offices of a wireline network.
Figure 3:
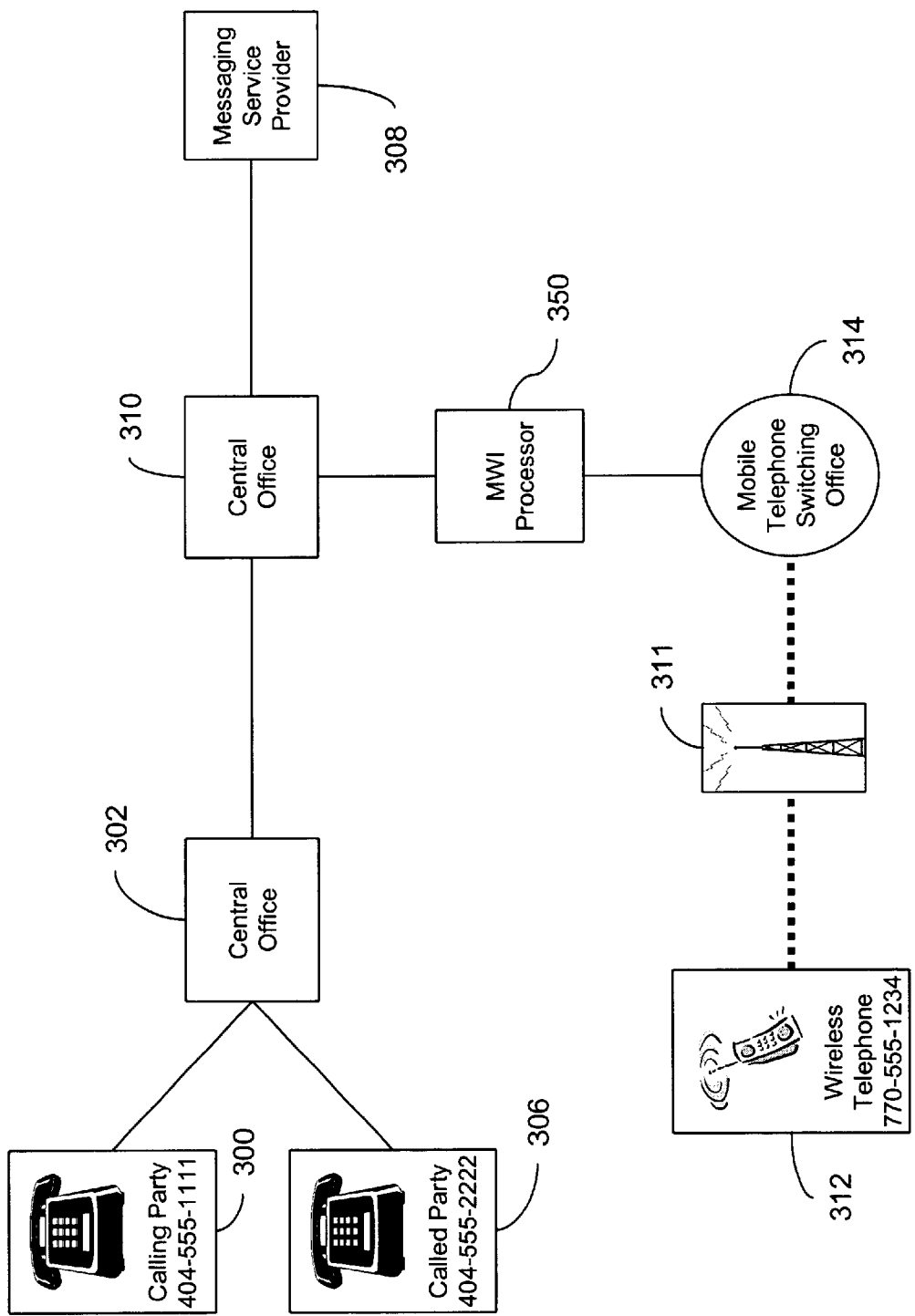
FIG. 3 is a schematic diagram of a system architecture according to an embodiment of the present invention.

FIG. 3 illustrates an embodiment of the system architecture of the present invention.

The components of the system architecture include a calling party 300, a central office 302, a called party 306, a messaging service provider 308, a central office 310, a wireless device 312, an MTSO 314, and an MWI processor 350. Central office 302 is in communication with calling party 300, called party 306, and central office 310. Central office 310 is in communication with messaging service provider 308, central office 302, and MWI processor 350. MWI processor 350 is in communication with central office 310 and MTSO 314. Finally, MTSO 314 is in communication with wireless device 312 through antenna 311. For illustration purposes, wireless device 312 is described herein as a wireless telephone.

MWI processor 350 is adapted to receive a ReportEventMessageAvailable message from central office 310 through an SS7 ISUP (Integrated Services Digital Network User Part) link, and to translate the message into a format recognizable to MTSO 314. MWI processor 350 is a computer or computer software, which could be characterized as a service control point (SCP) in the context of Advanced Intelligence Networks (AINs). As an example, MWI processor could be a Sun™ computer running a UNIX™ operating system.

Although FIG. 3 shows MWI processor 350 in communication with a single MTSO 314, in reality, MWI processor 350 could be linked to multiple MTSOs. Indeed, a single MWI processor could serve an entire network of MTSOs, providing central handling of large numbers of MWI messages.

In addition, although FIG. 3 shows MWI processor 350 as a separate component of the present invention, one of ordinary skill in the art would appreciate that MWI processor 350 could also be a part of another system component, for example, central office 310 or MTSO 314. Indeed, the present invention could execute the functions of MWI processor 350 anywhere between, and including, messaging service provider 308 to MTSO 314. Provisioning MWI processor 350 in these other locations is an alternate embodiment of the present invention.

Figure 4:
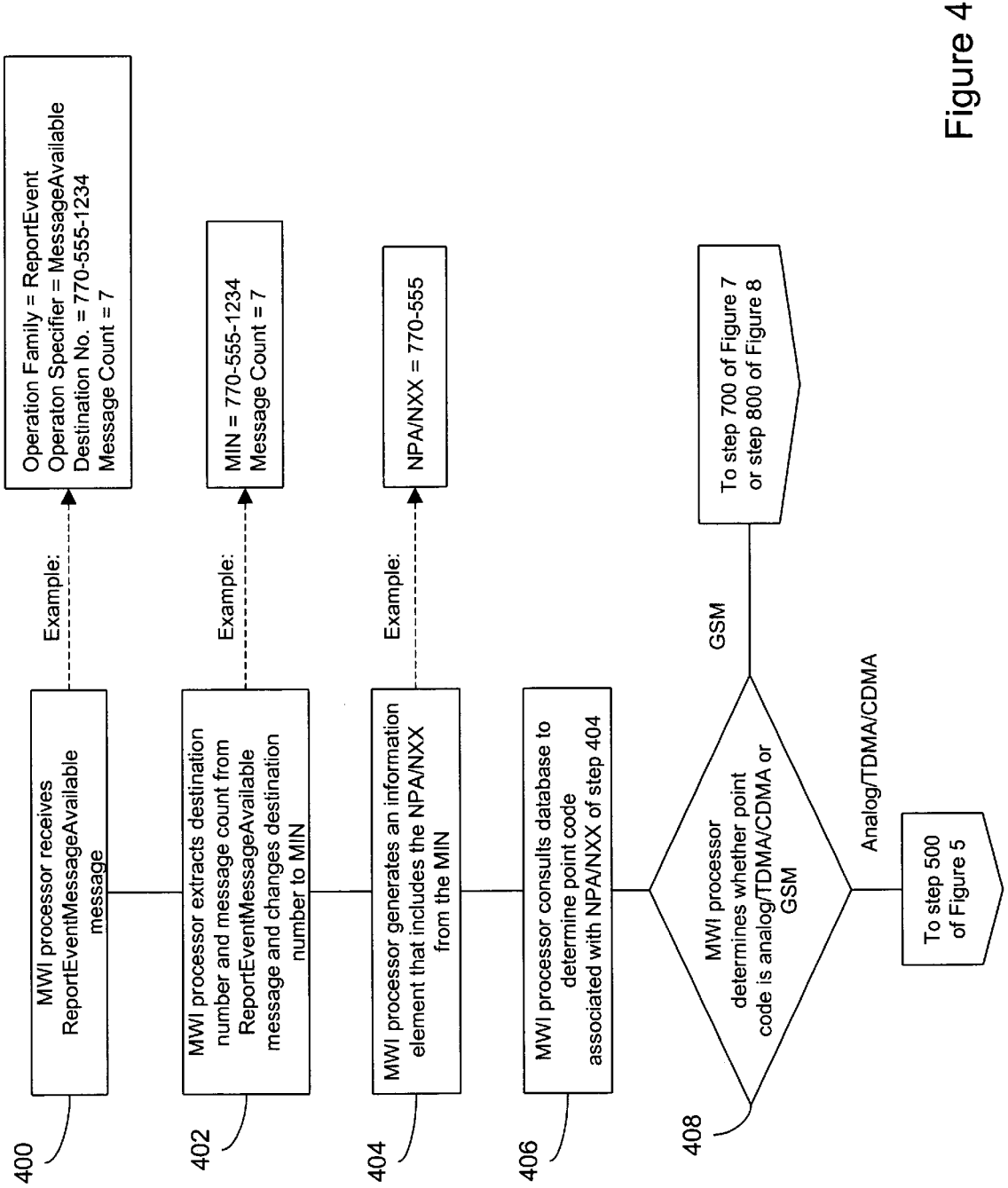
FIG. 4 is a flow chart illustrating a method for delivering an MWI message to wireless devices, according to an embodiment of the present invention.

FIG. 4 illustrates a representative embodiment of the method of the present invention. This method involves receiving a ReportEventMessageAvailable message transmitted by either a central office or an SS7-enabled messaging service provider, and converting the message from a wireline TCAP format to a format compatible with a wireless network, such as analog, CDMA, TDMA, or GSM. MWI processor 350 executes the method, regardless of the location at which MWI processor 350 is provisioned.

In step 400, MWI processor 350 receives the ReportEventMessageAvailable message through SS7-ISUP signaling. This ReportEventMessageAvailable message is delivered concurrently with other ReportEventMessageAvailable messages delivered to other central offices in the wireline network (to activate MWIs on wireline telephones of the wireline network).

The ReportEventMessageAvailable message specifies an operation family, an operation specifier, a destination number (destinationDN), and a message count (numberOfMessages). As shown in FIG. 4, the operation family is ReportEvent and the operation specifier is MessageAvailable. The operation family and operation specifier parameters correspond to the TCAP specifications for a ReportEventMessageAvailable message.

The destination number is 770-555-1234, which corresponds to the telephone number of subscriber's wireless telephone 312 in FIG. 3.

The message count is seven (as an example), which corresponds to the number of messages received by messaging service provider 308.

In step 402, MWI processor 350 extracts the destination number and the message count from the ReportEventMessageAvailable message, and changes the name of the destination number to mobile identification number (MIN). Therefore, in this example, the MIN is 770-555-1234 and the message count is seven.

In step 404, MWI processor 350 generates an information element that includes the NPA/NXX from the MIN. As shown in FIG. 4, the NPA/NXX in this example is 770-555.

In step 406, MWI processor 350 consults a database to determine the point code associated with the NPA/NXX generated in step 404. The database could be a component of MWI processor 350 or could be external to MWI processor 350. For every NPA/NXX in a network, the database cross-references a point code corresponding to the destination home location register (HLR) that serves the particular NPA/NXX. A destination HLR can be a subsystem of an MTSO, or can be network centric, provisioned with other destination HLRs in a central facility.

In this example, the database cross-references NPA/NXX 770-555 with point code 11.51.113, as illustrated in the representative database table below. The point code 11.51.113 corresponds to the destination HLR embedded in MTSO 314.

| NPA/NXX | Point Code |
|---|---|
| 770-555 | 11.51.113 |
| 404-792 | 001.002.052 |
| 678-555 | 252.001.002 |

In an alternate embodiment of the present invention, the database includes further information to accommodate the technique of using pseudo NPAs to deliver an MWI message from a message service provider to a wireless telephone number of a shared NPA/NXX. This technique is disclosed in the related application Ser. No. 09/742,377, described above. In such a situation, a pseudo NPA is delivered to MWI processor 350. The pseudo NPA is a special or inactive NPA that an MTSO would not recognize. Therefore, in this alternate embodiment, step 406 further includes translating the pseudo NPA to the real NPA of wireless telephone 312.

For example, assume that the telephone number (770-555-1234) of wireless telephone 312 is part of a shared NPA/NXX, including both wireline and wireless telephones. A message routing system as disclosed in related application Ser. No. 09/742,377 might use the pseudo NPA/NXX 994-555 to route messages to the wireless telephones of that shared NPA/NXX, and might use the real NPA/NXX to routes messages to the wireline telephones. Therefore, the message received by MWI processor 350, intended for wireless telephone 312, would reference the telephone number 994-555-1234. Accordingly, to route the message to the proper wireless telephone, MWI processor 350 would have to translate the pseudo NPA back to the real NPA.

In an example of this alternate embodiment, MWI processor 350 would consult a database table that cross-references the pseudo NPA with both a point code and a real NPA, as illustrated in the representative database table below.

| NPA/NXX | Point Code | NPA/NXX Output |
|---|---|---|
| 994-555 | 11.51.113 | 770-555 |
| 678-555 | 11.51.114 | 678-555 |

As shown in the above table, a message referencing the pseudo NPA/NXX 994-555 would translate to the real NPA/NXX 770-555, and would also correspond to the point code of the destination HLR, 11.51.113. The other entry in the table represents an NPA/NXX that is not shared, therefore not requiring a pseudo NPA. Thus, the NPA/NXX output would be the same as the NPA/NXX referenced in the message.

Figure 5:
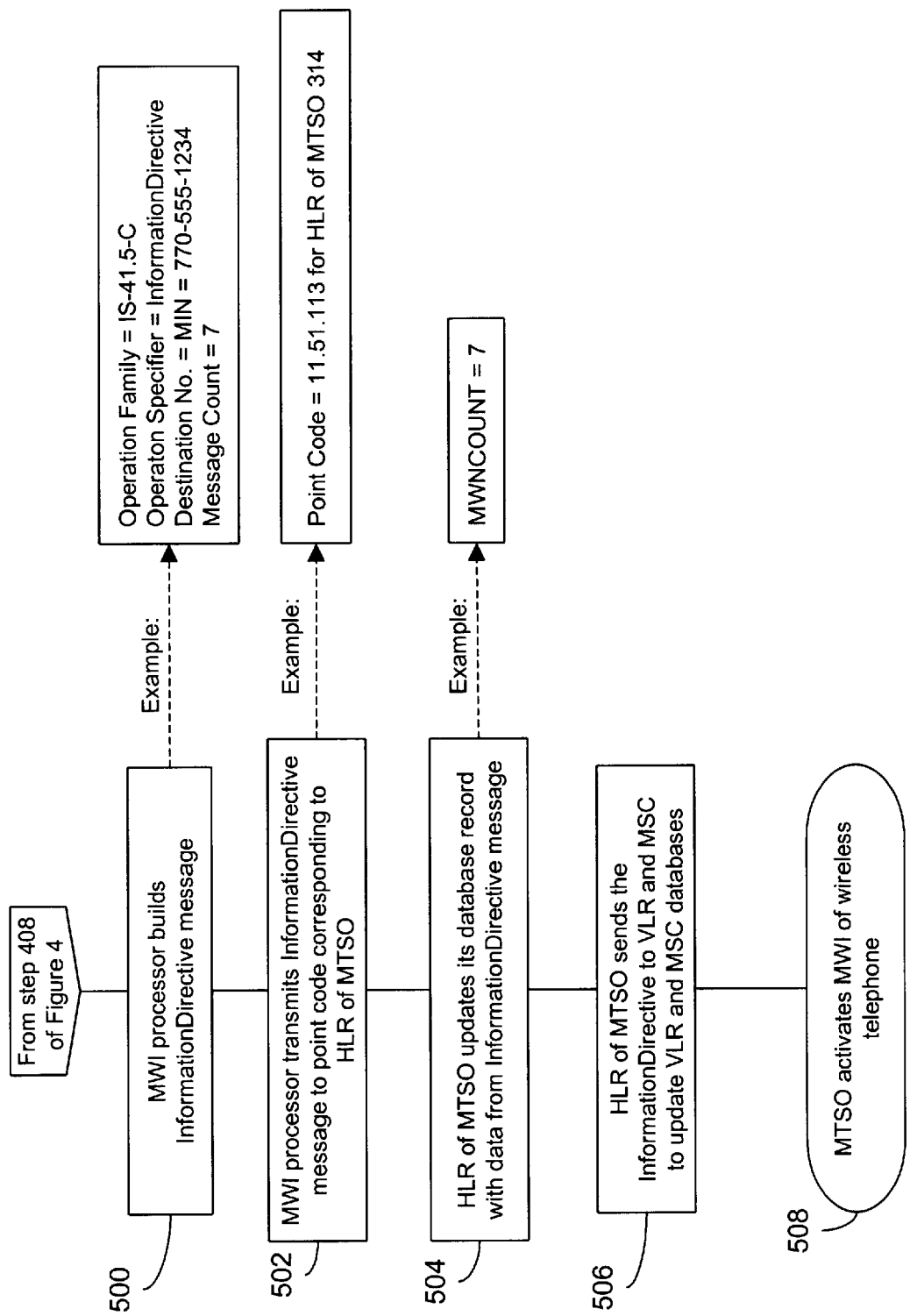
FIG. 5 is a flow chart illustrating a method for delivering a MWI message to wireless devices operating under analog, TDMA, or CDMA protocols, according to an embodiment of the present invention.
Figure 6:
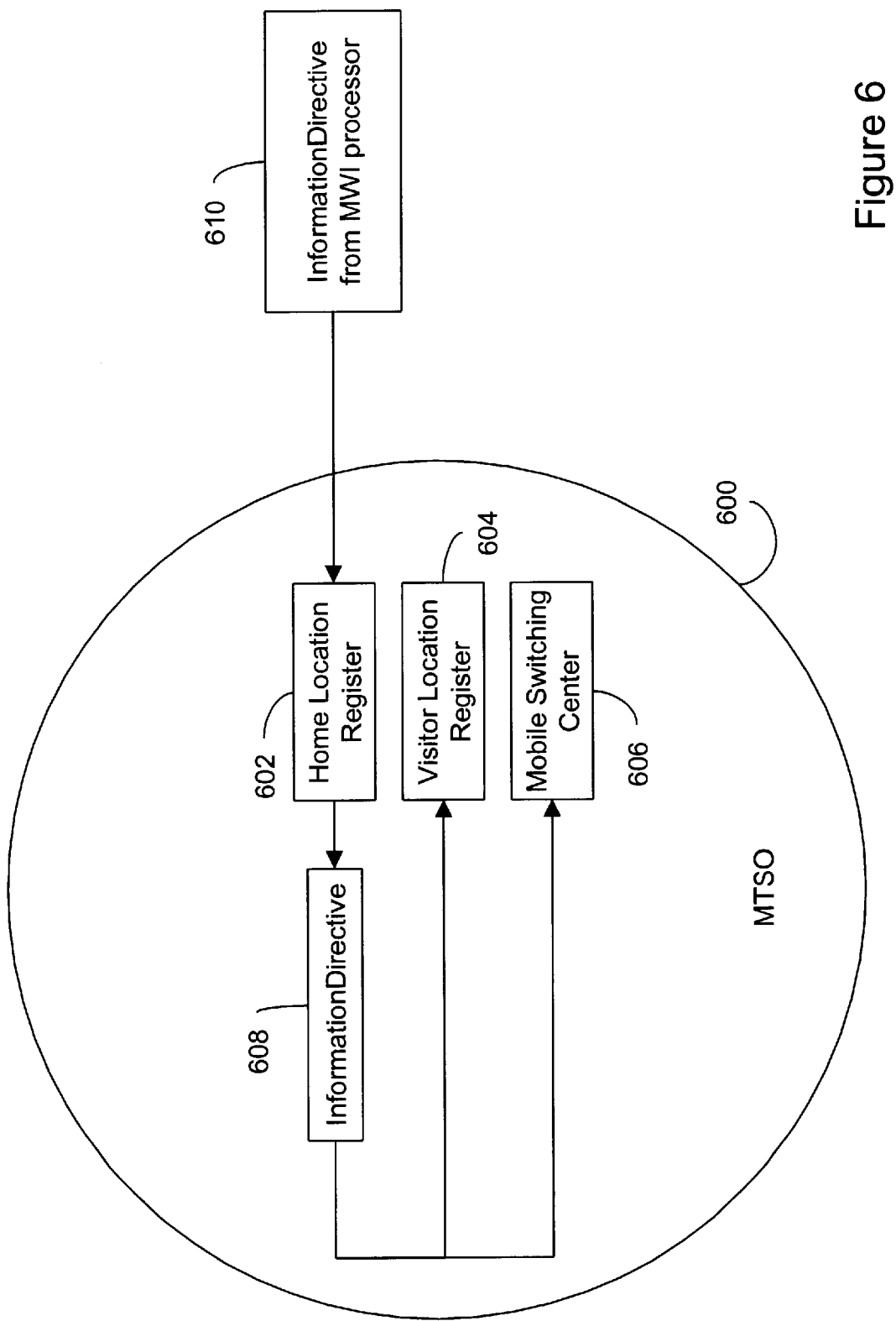
FIG. 6 is a schematic diagram illustrating a method for delivering a message to an MTSO, according to an embodiment of the present invention.
Figure 7:
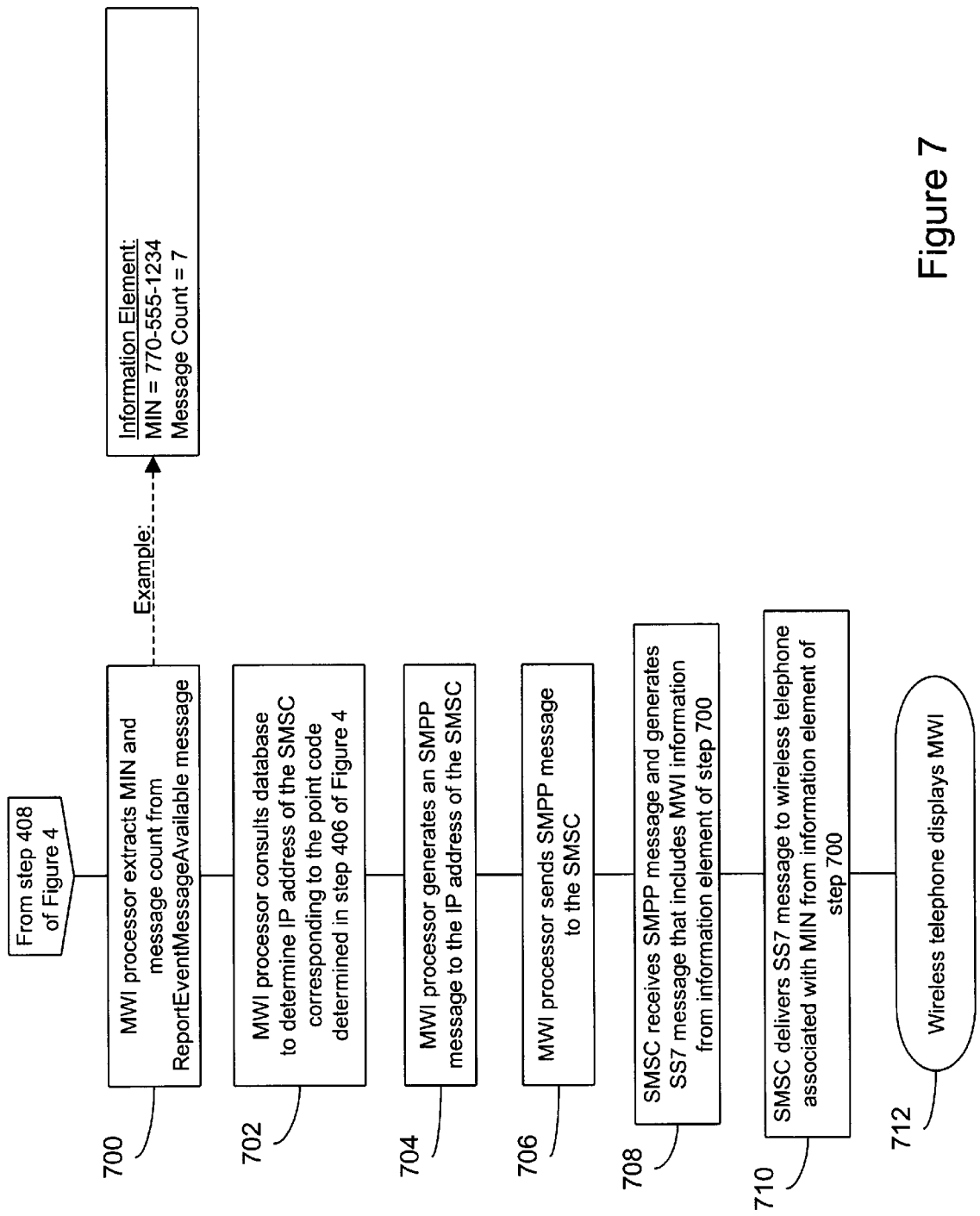
FIGS. 7 and 8 are flow charts illustrating methods for delivering an MWI message to GSM-enabled wireless devices, according to embodiments of the present invention.
Figure 8:
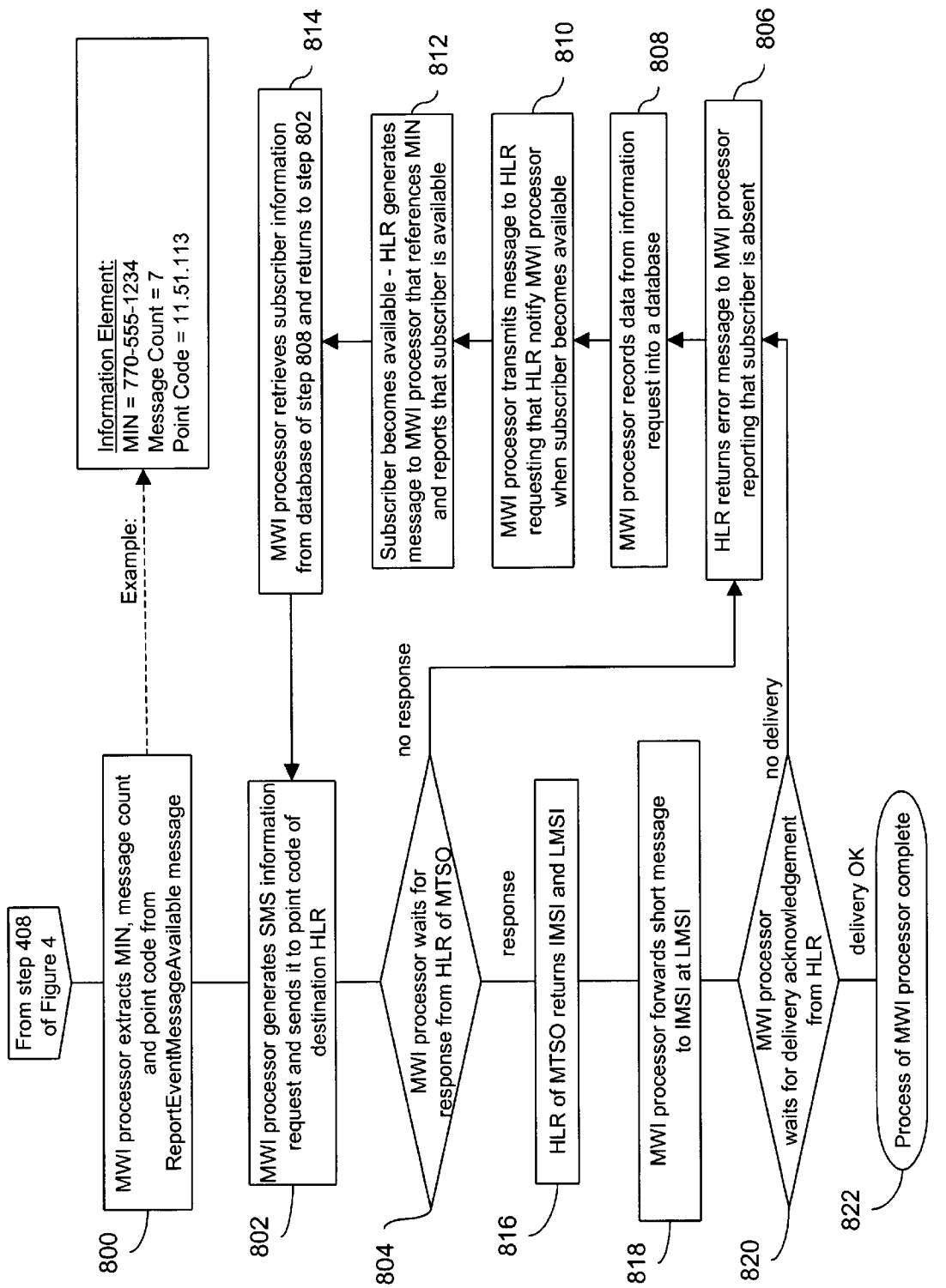

Having identified the point code and the real NPA/NXX, in step 408, MWI processor 350 determines whether the point code is associated with a wireless network operating under analog, TDMA, or CDMA protocols, or whether the point code is associated with a wireless network operating under a GSM protocol. The remaining steps in delivering the MWI message differ according to the outcome of this determination. FIGS. 5 and 6 illustrate a method for delivering the MWI message to wireless devices operating under analog, TDMA, or CDMA protocols. FIGS. 7 and 8 illustrate methods for delivering the MWI message to GSM-enabled wireless devices.

As shown in FIG. 5, in step 500, MWI processor 350 builds an InformationDirective message, based on the message count from step 402 of FIG. 4 and the destination number determined by the database look-up in step 406 of FIG. 4. In this example, the message count is seven and the destination number is 770-555-1234, which is the mobile identification number of wireless telephone 312.

As shown in step 500, the InformationDirective message also includes an operation family that complies with IS-41 and an operation specifier set to InformationDirective. As an example, the IS-41 operation family corresponds to *Cellular Radiotelecommunications Intersystem Operations: Signaling Protocols*, TIA/EIA Interim Standard IS-41.5-C, published February 1996. The InformationDirective is an operation defined as a part of the IS-41 standard. An important aspect of the present invention is the unique manner in which this InformationDirective message is used.

According to the IS-41 standard, an InformationDirective is used by an HLR to direct a serving system to provide a specified notification to an idle mobile station. Typically, the InformationDirective message is used to notify the service system that a condition has changed on a particular wireless device served by the serving system. FIG. 6 illustrates this intended use of the InformationDirective, with reference to a simplified representation of an MTSO 600.

MTSO 600 includes an HLR 602, a visitor location register (VLR) 604, and a mobile switching center (MSC) 606. HLR 602 stores data used to identify and verify subscribers, and to determine the features and services associated with those subscribers. VLR 604 is a local database maintained by a wireless provider to store information about roaming subscribers of other wireless providers. VLR 604 receives the information about the roaming subscriber's from the HLRs of those roaming subscribers.

In the example of FIG. 6, HLR 602 is associated with a first wireless provider and VLR 604 is associated with a second wireless provider. When a subscriber of the first wireless provider (HLR 602) roams into the area of coverage supported by the second wireless provider, the second wireless provider needs to know the features and services associated with that subscriber to provide appropriate service. For example, if a subscriber has an MWI feature, the second wireless provider would need to know the message count that should be displayed. Therefore, HLR 602 must transfer the subscriber data to VLR 604. InformationDirective message 608 is the vehicle by which this data transfer takes place.

Thus, InformationDirective message 608 is an outgoing message from HLR 602 to VLR 604, to update the database of VLR 604. Likewise, if MSC 606 requires data maintained by HLR 602 to perform its functions, HLR 602 delivers InformationDirective message 608 to MSC 606 as well.

Unlike the intended use of an InformationDirective, in which the message is an outgoing message of an HLR, the present invention uses the InformationDirective message as an input into an HLR. InformationDirective 610 of FIG. 6 represents this input into HLR 602.

Returning to FIG. 5, in step 502, MWI processor 350 transmits the InformationDirective message to the point code determined in the database look-up of step 406 of FIG. 4. The point code corresponds to the HLR of the MTSO serving the particular wireless device. In this example, the point code 11.51.113 corresponds to the HLR of MTSO 314.

In step 504, the HLR of MTSO 314 updates its database record with the data from the InformationDirective message. In this example, the update involves changing the MessageWaitingNotificationCount of the record corresponding to MIN 770-555-1234. The MessageWaitingNotificationCount (MWNCOUNT) is a parameter that carries the type and number of messages currently stored in a subscriber's mailbox, as defined by TIA/EIA IS-41. In this example, the HLR of MTSO 314 updates MWNCOUNT to read seven as the message count.

After the HLR of MTSO 314 receives the InformationDirective message and updates its database, in step 506, the HLR of MTSO 314 immediately sends the same InformationDirective message to the VLR and MSC associated with MTSO 314, to update the databases of the VLR and MSC.

Finally, in step 508, MTSO 314 activates the MWI of wireless telephone 312 through an SS7 link. The MWI is, for example, a displayed icon showing that seven messages are stored in the mailbox. Alternately, if wireless telephone 312 is roaming in the area of coverage supported by the another wireless provider, the MTSO of that other wireless provider would access the updated data stored in its VLR of MTSO 314 and activate the MWI of wireless telephone 312.

After the messages are retrieved from the voicemail box, messaging service provider 318 transmits a new ReportEventMessageAvailable indicating that zero messages are waiting. In response, MWI processor 350 generates a new InformationDirective message reporting that zero messages are waiting. That InformationDirective message is processed in the manner described above, thereby clearing the MWI icon from the display of wireless telephone 312.

FIGS. 7 and 8 illustrate two methods for delivering the MWI message to GSM-enabled wireless devices, according to further embodiments of the present invention. In these embodiments, MWI processor 350 manipulates the ReportEventMessageAvailable to accommodate special messaging requirements of GSM wireless telephones. Specifically, GSM wireless telephones require Short Message Service (SMS) messaging, and therefore require an SMS message waiting indicator, as opposed to the TDMA and CDMA message waiting indicators.

FIG. 7 outlines a first method for delivering the MWI message to GSM-enabled wireless devices. Continuing from step 408 of FIG. 4, after the point code is determined to be a GSM point code, in step 700, MWI processor 350 extracts the MIN and message count from the ReportEventMessageAvailable message. MWI processor 350 packages this data into an information element, as shown in FIG. 7.

In step 702, MWI processor 350 consults a database to determine an IP address associated with the point code determined in step 406 of FIG. 4. Unlike the analog/TDMA/CDMA method described above (FIGS. 5 and 6), the point code in this GSM method points to a Short Message Service Center (SMSC), rather than an HLR of a MTSO. Each SMSC corresponds to a certain IP address.

In step 704, MWI processor 350 generates a message addressed to the IP address of the SMSC using Short Message Peer-to-Peer (SMPP) protocol. In general, SMPP protocol provides the capability to deliver email and voicemail between wireline and wireless networks.

In step 706, MWI processor 350 sends the SMPP message to the SMSC.

In step 708, the SMSC receives the SMPP message and generates an SS7 message that includes the MWI information from the information element of step 700 (which in this example, is the message count of seven). MWI processor 350 addresses the SS7 message to the MIN listed in the information element of step 700, or 770-555-1234 in this example.

In step 710, the SMSC delivers the SS7 message to the wireless telephone associated with the MIN (770-555-1234) listed in the information element of step 700. Thus, in this example, the SS7 message is delivered to wireless telephone 312.

In step 712, wireless telephone 312 responds to the SS7 message by either displaying the text message or activating an icon. Typically, newer wireless telephones support the icon feature, while older telephones (e.g., those manufactured before 1995) do not. In either case, wireless telephone 312 would indicate that seven messages are being held in the unified voicemail box associated with subscriber of wireless telephone 312 (770-555-1234).

FIG. 8 outlines a second method for delivering the MWI message to GSM-enabled wireless devices. Continuing from step 408 of FIG. 4, after the point code is determined to be a GSM point code, in step 800, MWI processor 350 extracts the MIN, message count, and point code from the ReportEventMessageAvailable message. As discussed above in reference to step 406 of FIG. 4, the point code corresponds to the destination HLR of the MTSO serving the wireless telephone with the specified MIN. MWI processor 350 packages this data into an information element, as shown in FIG. 8. In this example, the MIN is 770-555-1234, the message count is seven, and the point code is 11.51.113 (which corresponds to MTSO 314).

In step 802, MWI processor 350 generates an SMS information request and sends it to the point code (11.51.113) of the destination HLR. The information request contains the MIN (770-555-1234) and queries the HLR for the location of the wireless device corresponding to that MIN, i.e., wireless telephone 312 in this example. As an example, the SMS information request could be a SendRoutingInfoForShortMsg mechanism, as defined in the GSM standard.

In step 804, MWI processor 350 waits for a response from the HLR of MTSO 314. A response indicates whether the subscriber is available or unavailable.

If the subscriber is unavailable, e.g., the subscriber's wireless telephone 312 is turned off, then in step 806, the HLR of MTSO 314 returns an error message to MWI processor 350 reporting that the subscriber is absent.

In step 808, MWI processor 350 records the data from the information request of step 802 into a database.

Then, in step 810, MWI processor 350 transmits a message to the HLR of MTSO 314 requesting that the HLR notify MWI processor 350 when the subscriber's wireless telephone 312 becomes available. The message to the HLR could be, for example, an alert_service_center mechanism, as defined in the GSM standard. MWI processor 350 then waits for a further message from the HLR of MTSO 314.

In step 812, when the subscriber's wireless telephone 312 becomes available, the HLR of MTSO 314 generates a message to MWI processor 350 that references the MIN (770-555-1234) of wireless telephone 314 and reports that wireless telephone 312 is now available.

In response, in step 814, MWI processor 350 retrieves the subscriber's information from the database of step 808 and returns to step 802 to reconstruct the SMS information request and re-deliver it to the HLR of MTSO 314.

Returning to step 804, if the subscriber is available, then in step 816 the HLR of MTSO 314 returns an International Mobile Subscriber Identity (IMSI) and a Local Mobile Station Identity (LMSI) associated with wireless telephone 312. The IMSI is a hardware identifier that uniquely identifies a subscriber to a mobile telephone service. The IMSI includes a 50-bit field that identifies the home country and carrier of a wireless telephone. The LMSI is a 10-digit location identifier that indicates the location, e.g., a particular switch, to which a response message should be sent.

In step 818, MWI processor 350 forwards a short message to the IMSI and LMSI specified in step 816. The short message is a text message indicating to the subscriber that she has messages recorded in her voicemail box. For example, the text message could read, "You have seven messages."

In step 820, MWI processor 350 waits for a delivery acknowledgement from the HLR of MTSO 314. If MTSO 314 confirms the delivery of the text message, then the process of MWI processor 350 is complete in step 822. If the wireless telephone 312 of the subscriber is unavailable and the text message cannot be delivered, then, returning to step 806, the HLR of MTSO 314 returns an error message to MWI processor 350. The method then continues as described above for steps 806 through 814 until wireless telephone 312 becomes available and remains available through successful delivery of the text message (step 822).

In a representative embodiment of the present invention, the short message sent to wireless telephone 312 in step 818 includes flags to delete superseded messages and to accommodate telephones that can display MWI icons. For example, one flag could instruct the wireless telephone to replace a previous message concerning the number of stored voicemail box messages with a new message updating the number of messages. This flag would avoid filling a subscriber's voicemail box with irrelevant superseded messages.

As another example, another flag attached to the text message could instruct the wireless telephone to ignore the text message and instead display an MWI icon. A wireless telephone that supports the MWI icon would recognize this flag and display only the icon. A wireless telephone that does not have the MWI icon capability would not recognize the flag and would display the text message, and not the icon.

On GSM-enabled wireless telephones that display an MWI icon, after a subscriber retrieves her messages, messaging service provider 318 can use the above-described methods to deliver a message turning off the MWI icon. For GSM-enabled wireless telephones that do not support an MWI icon and instead sent a text message, after a subscriber retrieves her messages, the subscriber can erase the text message that reported the stored messages. Alternately, the system can erase the text message.

As examples of hardware implementations of the present invention, the systems and methods described above work on MTSOs manufactured by Lucent™ and Ericcson™.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for delivering a message waiting indicator message to a wireless system comprising:
   receiving a message, wherein the message is a Signaling System 7 transaction capabilities application part message that includes message waiting data;
   determining a mobile identification number associated with the message;
   determining a point code associated with the mobile identification number;
   determining a protocol corresponding to the point code; and
   forwarding a second message to the point code in the wireless system,
   wherein if the point code corresponds to an analog protocol, a Time Division Multiple Access (TDMA) protocol, or a Code Division Multiple Access (CDMA) protocol, the second message is an InformationDirective message that contains an operation family, an operation specifier, a destination number, and the message waiting data.

2. The method of claim 1, wherein the operation family is ReportEvent, the operation specifier is MessageAvailable, the destination number is the mobile identification number, and the message waiting data is a message count.

3. The method of claim 1, wherein the InformationDirective message complies with TIA/EIA Interim Standard IS-41.

4. The method of claim 1, wherein the forwarding further comprises responding to the InformationDirective message at a mobile telephone switching office by activating the message waiting indicator on a wireless device associated with the mobile identification number.

5. The method of claim 4, wherein the message waiting indicator is one of a stutter dial tone, an illuminated light, and an icon.

6. The method of claim 1, wherein the point code points to a home location register of a mobile telephone switching office that serves a wireless device associated with the mobile identification number.

7. A method for delivering a message waiting indicator message to a wireless system comprising:
   receiving a message, wherein the message is a Signaling System 7 transaction capabilities application part message that includes message waiting data;
   determining a mobile identification number associated with the message;
   determining a point code associated with the mobile identification number;
   determining a protocol corresponding to the point code; and
   forwarding a second message to the point code in the wireless system,
   wherein the determining a protocol comprises determining if the point code corresponds to a Global System for Mobile Communications (GSM) protocol, and wherein if the point code corresponds to a GSM protocol, the forwarding a second message comprises:
      determining an address of a short message service center corresponding to the point code, and
      forwarding a short message peer-to-peer message to the address of the short message service center, wherein the short message peer-to-peer message is the second message.

8. The method of claim 7, further comprising forwarding a second Signaling System 7 message from the short message service center to a wireless device associated with the mobile identification number.

9. The method of claim 8, wherein the second Signaling System 7 message activates a message waiting indicator on the wireless device to display the message waiting data.

10. The method of claim 9, wherein the message waiting indicator is one of a text message and an icon.

11. The method of claim 7, wherein the address is an Internet Protocol address.

12. A method for delivering a message waiting indicator message to a wireless system comprising:
   receiving a message, wherein the message is a Signaling System 7 transaction capabilities application part message that includes message waiting data;
   determining a mobile identification number associated with the message;
   determining a point code associated with the mobile identification number;
   determining a protocol corresponding to the point code; and
   forwarding a second message to the point code in the wireless system,
   wherein the determining a protocol comprises determining if the point code corresponds to a Global System for Mobile Communications (GSM) protocol, and wherein if the point code corresponds to a GSM protocol, the forwarding a second message comprises:
      forwarding a short message service information request to the point code, wherein the short message service information request references the mobile identification number and queries for a location of a wireless device associated with the mobile identification number,
      wherein the short message service information request is the second message.

13. The method of claim 12, wherein if the wireless device is available, the method further comprises forwarding a short message to the wireless device, wherein the short message is the message waiting indicator.

14. The method of claim 13, wherein forwarding the short message comprises:
   receiving the International Mobile Subscriber Identity and Local Mobile Station Identity of the wireless device from a home location register associated with the point code, and
   forwarding the short message to the International Mobile Subscriber Identity at the Local Mobile Station Identity.

15. The method of claim 12, wherein if the wireless device is unavailable, the method further comprises:
   recording data of the short message service information request in a database,
   requesting that a home location register associated with the point code report when the wireless device becomes available,
   when the wireless becomes available, retrieving the data of the short message service information request from the database, and
   forwarding a second short message service information request to the point code.

16. A method for delivering a message waiting indicator message to a wireless system comprising:
   receiving a message, wherein the message is a ReportEventMessageAvailable message;
   determining a mobile identification number associated with the message;
   determining a point code associated with the mobile identification number;
   determining a protocol corresponding to the point code; and
   forwarding a second message to the point code in the wireless system.

17. A method for delivering a message waiting indicator message to a wireless system comprising:
   receiving a message, wherein the message is a Signaling System 7 transaction capabilities application part message that includes message waiting data;
   determining a mobile identification number associated with the message;
   determining a point code associated with the mobile identification number;
   determining a protocol corresponding to the point code; and
   forwarding a second message to the point code in the wireless system,
   wherein if the mobile identification number includes a pseudo numbering plan area (NPA), the determining a point code further comprises replacing the pseudo NPA with a real NPA in the mobile identification number.

18. A system for delivering a message waiting indicator message to a wireless system comprising:
   (a) a messaging service provider adapted to transmit message waiting indicator messages;
   (b) a central office in communication with the messaging service provider, wherein the central office is adapted to transmit ReportEventMessageAvailable messages in response to message waiting indicator messages from the messaging service provider;
   (c) a message waiting indicator processor in communication with the central office, wherein the message waiting indicator processor is adapted to receive a ReportEventMessageAvailable message from the central office, and
   to translate the ReportEventMessageAvailable message into an InformationDirective for analog, Time Division Multiple Access, and Code Division Multiple Access wireless systems; and
   (d) a mobile telephone switching office in communication with the message waiting indicator processor, wherein the mobile telephone switching office is adapted to receive a translated ReportEventMessageAvailable message from the message waiting indicator processor and, in response, to activate a message waiting indicator of a corresponding wireless device.

19. The system of claim 18, wherein the message waiting indicator processor is adapted to translate the ReportEventMessageAvailable message into one of a short message peer-to-peer message and a short message service information request for Global System for Mobile Communications wireless systems.

20. The system of claim 18, wherein the message waiting indicator processor is adapted to send the InformationDirective to a home location register of the mobile telephone switching office.

21. The system of claim 18, wherein the message waiting indicator processor is provisioned in the central office.

22. The system of claim 18, wherein the message waiting indicator processor is provisioned in the mobile telephone switching office.

23. The system of claim 18, wherein the central office and the message waiting indicator processor are in communication through a Signaling System 7 Integrated Services Digital Network User Part communication link.

24. The system of claim 18, wherein the message waiting indicator processor is further adapted to translate a pseudo numbering plan area that is referenced in the ReportEventMessageAvailable message into a real numbering plan area.

25. A method for delivering a message waiting indicator message to a wireless system comprising the steps of:
   (a) transmitting a ReportEventMessageAvailable message from a central office to a processor, wherein the ReportEventMessageAvailable message contains an operation family, an operation specifier, a destination number, and message data;
   (b) extracting the destination number and message data from the ReportEventMessageAvailable, wherein the destination number is a mobile identification number;
   (c) generating an information element containing an NPA/NXX of the mobile identification number;
   (d) determining a point code associated with the NPA/NXX;
   (e) determining whether the point code is part of an analog, Time Division Multiple Access (TDMA), Code Division Multiple Access (CDMA), or Global System for Mobile Communications (GSM) wireless system;
   (f) sending an InformationDirective message to the point code, if the point code is part of an analog, TDMA, or CDMA wireless system; and
   (g) sending one of a short message peer-to-peer message and a short message service information request to the point code, if the point code is part of a GSM wireless system.

26. The method of claim 25, wherein, for the step of sending an InformationDirective message to the point code, the InformationDirective message contains an operation family that complies with IS-41, an operation specifier set to InformationDirective, the mobile identification number, and the message data, and the point code corresponds to a home location register of a mobile telephone switching office, wherein the home location register updates its database with the InformationDirective message, and wherein the mobile telephone switching office activates a message waiting indicator on a wireless device associated with the mobile identification number.

27. The method of claim 25, wherein the step of sending one of a short message peer-to-peer message and a short message service information request to the point code comprises the steps of:

determining an address of a short message service center corresponding to the point code, forwarding the short message peer-to-peer message to the address of the short message service center, and forwarding a Signaling System 7 message from the short message service center to a wireless device associated with the mobile identification number.

28. The method of claim 25, wherein the step of sending one of a short message peer-to-peer message and a short message service information request to the point code comprises the steps of:

forwarding a short message service information request to the point code, wherein the short message service information request references the mobile identification number and queries for a location of a wireless device associated with the mobile identification number, and if the wireless device is available, forwarding a short message to the wireless device, wherein the short message is the message waiting indicator.

29. The method of claim 28, wherein forwarding the short message comprises:

receiving the International Mobile Subscriber Identity and Local Mobile Station Identity of the wireless device from a home location register associated with the point code, and forwarding the short message to the International Mobile Subscriber Identity at the Local Mobile Station Identity.

30. The method of claim 28, further comprising the steps of:

if the wireless device is unavailable, recording data of the short message service information request in a database, requesting that a home location register associated with the point code report when the wireless device becomes available, when the wireless becomes available, retrieving the data of the short message service information request from the database, and forwarding a second short message service information request to the point code.

31. The method of claim 25, wherein if the mobile identification number includes a pseudo numbering plan area (NPA), step (d) further comprises replacing the pseudo NPA with a real NPA in the mobile identification number.

* * * * *